United States Patent [19]

Stjernholm

[11] Patent Number: 5,418,843
[45] Date of Patent: May 23, 1995

[54] METHOD FOR ESTIMATING TRAFFIC DENSITY IN MOBILE TELEPHONE NETWORKS

[75] Inventor: Paul Stjernholm, Stockholm, Sweden
[73] Assignee: Televerket, Farsta, Sweden
[21] Appl. No.: 185,973
[22] PCT Filed: Jun. 24, 1993
[86] PCT No.: PCT/SE93/00575
§ 371 Date: Feb. 10, 1994
§ 102(e) Date: Feb. 10, 1994
[87] PCT Pub. No.: WO94/05098
PCT Pub. Date: Mar. 3, 1994

[30] Foreign Application Priority Data

Aug. 18, 1992 [SE] Sweden .................. 9202369

[51] Int. Cl.$^6$ .............. H04M 3/22; H04M 11/00; H04M 15/00; H04Q 9/00
[52] U.S. Cl. ..................... 379/112; 379/34; 379/58; 379/59; 379/111; 379/113; 455/33.1; 455/33.4; 455/54.1; 455/67.1
[58] Field of Search ........... 379/32, 34, 59, 58, 379/111, 112, 113; 455/33.1, 33.4, 54.1, 56.1, 67.1

[56] References Cited

U.S. PATENT DOCUMENTS

| | | | |
|---|---|---|---|
| 4,670,899 | 6/1987 | Brody | 455/56.1 |
| 4,701,934 | 10/1987 | Jasper . | |
| 4,706,286 | 10/1987 | Sturza . | |
| 5,043,736 | 8/1991 | Darnell | 342/357 |
| 5,056,106 | 8/1991 | Wang et al. . | |
| 5,095,500 | 3/1992 | Tayloe et al. | 379/32 |
| 5,157,709 | 10/1992 | Ohteru | 379/58 |
| 5,175,867 | 12/1992 | Wejke et al. | 455/67.1 |
| 5,201,061 | 4/1993 | Goldberg | 455/67.1 |
| 5,263,177 | 11/1993 | Schieve | 455/56.1 |
| 5,268,694 | 12/1993 | Jan et al. | 455/33.4 |
| 5,289,183 | 2/1994 | Hassett | 455/54.1 |
| 5,293,642 | 3/1994 | Lo | 455/67.1 |

FOREIGN PATENT DOCUMENTS

| | | |
|---|---|---|
| 0389972 | 3/1990 | European Pat. Off. . |
| 0458768 | 4/1991 | European Pat. Off. . |
| 2-26420 | 1/1990 | Japan . |
| 2234142 | 5/1990 | United Kingdom . |
| WO90/10342 | 7/1990 | WIPO . |

OTHER PUBLICATIONS

IEEE Transactions on Communications, vol. Com–32, No. 7, Jul. 1984, "Performance of Portable Telephone Using Spread Spectrum".

*Primary Examiner*—Stephen Chin
*Assistant Examiner*—Vijay Shankar
*Attorney, Agent, or Firm*—Oblon, Spivak, McClelland, Maier, & Neustadt

[57] ABSTRACT

A method is employed for estimating traffic density in a mobile telephone network. A specialized measuring mobile unit which is capable of determining its own position independently of the system is allowed to pass through relevant traffic routes during which time the measuring mobile station transmits a radius signal as well as its position to the various fixed measuring stations. The signal strength received from the measuring mobile station is recorded synchronously with the aid of a number of suitably cited measuring base stations. The measuring values from the measuring stations are compiled with the respective registered positions so that an unambiguous relationship between the signal strength values and the position of a mobile station passing through the entire system is obtained. An actual traffic is then measured with the aid of the measuring station and the measurement results thereof are related to the geographic positions so that a topographic distribution of the traffic density is obtained.

6 Claims, 1 Drawing Sheet

METHOD FOR ESTIMATING TRAFFIC DENSITY IN MOBILE TELEPHONE NETWORKS

FIELD OF THE INVENTION

The present invention relates to a method for estimating traffic density in mobile telephone networks, mobile radio networks and the like. The method is based on synchronised signal strength measurements in the uplink and estimation of position, for example with the aid of a neural network.

PRIOR ART

A natural desire for an operator of a mobile telephone network is to obtain information on how the traffic is distributed geographically in the network. The information can be used for being able to plan the network with respect to capacity and with respect to quality.

It is know per se to measure signal strengths at base stations during a call in progress with a mobile station. See for example EP-A-431,956. However, it has been found to be difficult to obtain the actual geographical or topographic distribution of the traffic since it is difficult to determine the positions of the individual mobile stations.

SUMMARY OF THE INVENTION

The present invention relates to a method for estimating traffic density in mobile telephone networks, which method solves the above-mentioned problems. According to the invention, a measuring mobile station is allowed to pass through relevant traffic routes while it is sending a radio signal and at the same time recording its position. The signal which is received from the measuring mobile station is measured in synchronism with the aid of a number of suitably sited measuring stations. The measurement values from the measuring stations are then compiled with the respective registered positions of the measuring mobile station so that an unambiguous relationship between signal strength values and position is obtained.

After that, the actual traffic in the mobile telephone network is measured with the aid of the measuring stations and the consequent measurement results can then be related to geographic positions with the aid of the compilation so that a topographic distribution of the traffic density is obtained. Other embodiments of the invention are specified in greater detail in the subsequent patent claims.

BRIEF DESCRIPTION OF THE DRAWINGS

The invention will now be described in detail with reference to the attached drawing wherein the only FIGURE diagrammatically shows a mobile telephone system.

DETAILED DESCRIPTION OF PREFERRED EMBODIMENTS

Figure 1:
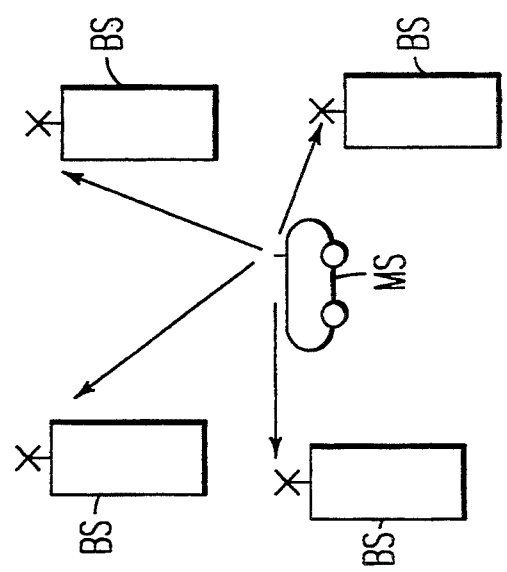

The FIGURE diagrammatically shows a measuring system which consists of a number of measuring stations BS and mobile stations MS, only one of which is drawn. Nothing prevents measuring stations from being placed at existing base station locations and utilizing the existing antenna equipment. It will be seen that a signal from the mobile station MS gives rise to a set of signal strengths at the measuring stations. The ratio between the signal strengths depends on the environment in the area and probably gives rise to a unique data set at each of the positions. The more measuring stations there are, the greater is the probability that each position provides a unique set of signal strength values. Conversely, a certain set of measurement values corresponds to one and only one position. It is this fact which is utilized in the present invention.

Thus, it is necessary to establish a set of signal strength values for each possible position of the mobile station. By allowing a number of measuring stations to measure signal strength and signal identity from a mobile station synchronously, a set of signal strength values is obtained at each measuring instant which corresponds to the current position of the mobile station at the time. A special measuring mobile station is used which is allowed to drive through all relevant traffic routes so that the measuring result becomes sufficiently comprehensive and extensive. The measuring mobile station regularly registers its position. The measuring stations obtain a reference between measurement result and current position. It is important that the measuring stations are selected in such a manner that redundancy in the measurement results is avoided so that an unambiguous relationship between measurement result and position can be established. If the existing measuring station placements do not meet these requirements, further measuring stations should consequently be set out.

The measurement result must then be compiled so that it will then be possible to estimate the position of the individual mobile stations. This can be done, for example, by using the coverage measurements which have been made and allowing them to train a neural network to translate combinations of signal strengths into position.

After that, synchronised signal strength measurements are carried out in the uplink of the actual traffic. The same measuring stations must be used as were used for the signal strength measurement. Current channels are measured synchronously for a relatively long time. Measuring stations measure the signal strength from a mobile station synchronously in order to generate sets of measurement values. Signal strength, frequency and signal identity are registered in order to obtain a statistical basis. Each combination of measurement values generates a position with the aid of the neural network and, taken together, information is obtained on how the traffic is distributed within the measured area.

Since the frequency and signal identity plan is known, the measured measurement results can be related to a respective measuring station. The results are obtained in the form of a number of measurement results per position and measuring station. By normalising against the total number of measurement results for a certain measuring station, the traffic density of the measuring station is obtained.

The traffic density per measuring station can also be weighted with traffic management. This can be measured or retrieved from statistics from the exchange. By adding the weighted traffic densities of all the measuring stations, a general view is obtained of how the traffic is distributed in the entire network. If this distribution is normalised, the traffic density for the entire network is obtained.

By simply making use of the measurement results and/or weights for certain time intervals, busy hour, etc., an understanding can be obtained of how the traffic is distributed at the time and how the traffic density varies with time.

The invention is only limited by the patent claims below.

I claim:

1. A method for estimating traffic density in mobile telephone networks, characterised by the steps:

allowing at least one measuring mobile station capable of determining the location of said measuring mobile station geographically, to pass through a relevant traffic routes, determining in said measuring mobile station the position of said measuring mobile station;

allowing the measuring mobile station to transmit a radio signal and its determined position during the pass through the relevant traffic routes, measuring signal strength received from the measuring mobile station synchronously with the aid of a number of suitably sited measuring stations, compiling the measurement values from the measuring stations with the respective registered position of the measuring mobile station so that an unambiguous relationship between the signal strength value and position is obtained, measuring the actual traffic in the mobile telephone network with the aid of the measuring stations, and relating the measurement resulting from the measurement of the actual traffic with geographic positions so that a topographic distribution of the traffic density is obtained.

2. A method according to claim 1, wherein said base stations are utilised as measuring stations.

3. A method according to claim 1 or 2, characterised in that the measurement of the actual traffic comprises a number of measuring stations synchronously measuring the signal from a mobile station which has traffic with one of these measuring stations.

4. A method according to claim 3, characterised in that the measurement of the actual traffic is carried out by all channels of affected measuring stations being successively passed through.

5. A method according to claim 3, characterised in that the measurement values from the measuring stations are compiled by training a neural network.

6. A method according to claim 3, characterised in that signal strength, frequency and signal identity are measured when measuring the actual traffic.

* * * * *